US011840649B2

(12) United States Patent
Carver et al.

(10) Patent No.: US 11,840,649 B2
(45) Date of Patent: Dec. 12, 2023

(54) TACK SOLUTIONS AND THEIR USE IN APPLYING FILMS TO SUBSTRATES

(71) Applicant: EASTMAN PERFORMANCE FILMS, LLC, St. Louis, MO (US)

(72) Inventors: Peter Ian Carver, Greensboro, NC (US); Andrew Joyce, Axton, VA (US)

(73) Assignee: Eastman Performance Films, LLC, St. Louis, MO (US)

( * ) Notice: Subject to any disclaimer, the term of this patent is extended or adjusted under 35 U.S.C. 154(b) by 413 days.

(21) Appl. No.: 17/290,826

(22) PCT Filed: Oct. 22, 2019

(86) PCT No.: PCT/US2019/057313
§ 371 (c)(1),
(2) Date: May 3, 2021

(87) PCT Pub. No.: WO2020/096762
PCT Pub. Date: May 14, 2020

(65) Prior Publication Data
US 2021/0371703 A1    Dec. 2, 2021

Related U.S. Application Data

(60) Provisional application No. 62/756,755, filed on Nov. 7, 2018.

(51) Int. Cl.
| | |
|---|---|
| C09J 5/02 | (2006.01) |
| B29C 63/48 | (2006.01) |
| C09J 11/06 | (2006.01) |
| C09J 133/04 | (2006.01) |
| B29K 675/00 | (2006.01) |
| B29L 9/00 | (2006.01) |

(52) U.S. Cl.
CPC ............... *C09J 5/02* (2013.01); *B29C 63/48* (2013.01); *C09J 11/06* (2013.01); *C09J 133/04* (2013.01); *B29C 2063/483* (2013.01); *B29K 2675/00* (2013.01); *B29L 2009/00* (2013.01); *C09J 2203/306* (2013.01); *C09J 2301/302* (2020.08); *C09J 2433/00* (2013.01); *C09J 2475/008* (2013.01)

(58) Field of Classification Search
CPC ........................................................ C09J 5/02
See application file for complete search history.

(56) References Cited

U.S. PATENT DOCUMENTS

| | | | |
|---|---|---|---|
| 2,118,664 A | 1/1937 | Bradshaw et al. | |
| 2,331,721 A | 8/1939 | Ostrofsky et al. | |
| 3,909,424 A | 9/1975 | Clark | |
| 4,199,649 A | 4/1980 | Yundt | |
| 5,518,786 A | 5/1996 | Johnson et al. | |
| 5,939,378 A | 8/1999 | Stringer et al. | |
| 6,699,825 B2 | 3/2004 | Rees et al. | |
| 6,927,237 B2 | 8/2005 | Hei et al. | |
| 6,998,369 B2 | 2/2006 | Hei et al. | |
| 8,241,428 B2 | 8/2012 | Cermenati et al. | |
| 8,246,906 B2 | 8/2012 | Hei et al. | |
| 8,940,122 B2 | 1/2015 | Cohen et al. | |
| 9,138,979 B2 | 9/2015 | Balakoff et al. | |
| 10,414,956 B2 | 9/2019 | Masuko et al. | |
| 2003/0068606 A1 | 4/2003 | Nicholls et al. | |
| 2005/0215448 A1 | 9/2005 | Evers et al. | |
| 2007/0187028 A1 | 8/2007 | Braun et al. | |
| 2007/0235061 A1 | 10/2007 | Mizuta et al. | |
| 2007/0281857 A1 | 12/2007 | Wilson et al. | |
| 2008/0003406 A1 | 1/2008 | Steelman | |
| 2013/0280499 A1 | 10/2013 | Kanno et al. | |
| 2018/0286278 A1 | 10/2018 | Alexandre et al. | |
| 2020/0017710 A1* | 1/2020 | Sumner | B64C 1/1492 |
| 2021/0251260 A1 | 8/2021 | Rithvik | |
| 2021/0371703 A1 | 12/2021 | Carver et al. | |
| 2022/0165180 A1 | 5/2022 | Farrow et al. | |
| 2023/0257632 A1 | 8/2023 | Carver et al. | |

FOREIGN PATENT DOCUMENTS

| | | |
|---|---|---|
| AU | 2007 202368 A1 | 6/2007 |
| CN | 1493635 A | 5/2004 |
| CN | 103538339 A | 1/2014 |
| CN | 205920675 U | 2/2017 |
| CN | 107856097 A | 3/2018 |
| CN | 108045061 A | 5/2018 |
| CN | 108248008 A | 7/2018 |
| CN | 207842238 U | 9/2018 |
| CN | 109229072 A | 1/2019 |
| CN | 107687985 A | 2/2020 |
| FR | 2629095 A1 | 9/1989 |
| JP | 3754868 B2 * | 12/2005 |
| JP | 2007160697 A | 6/2007 |

(Continued)

OTHER PUBLICATIONS

Co-pending U.S. Appl. No. 17/432,984, filed Aug. 23, 2021, Farrow et al.
PCT International Search Report for International Application No. PCT/US2019/057313 dated Feb. 4, 2020.
PCT International Search Report for International Application No. PCT/US2020/017849 dated May 4, 2020.
Anonymous, Self-Healing Paint Protection Film Edges Lifting, Llumar, Jan. 1, 2015, pp. 1-3.

(Continued)

*Primary Examiner* — Jeffry H Aftergut
(74) *Attorney, Agent, or Firm* — Michael K. Carrier

(57) ABSTRACT

The present invention is directed to tack solutions comprising formic acid, and their use in applying adhesive-coated films to substrates. In particular, paint protection films (PPFs) can be applied to vehicle bodies using the solutions of the present invention.

15 Claims, No Drawings

(56) References Cited

FOREIGN PATENT DOCUMENTS

| JP | 2009160738 A | 7/2009 |
|---|---|---|
| WO | WO 2004054727 A1 | 7/2004 |
| WO | WO 2020/176259 A1 | 9/2020 |

OTHER PUBLICATIONS

Norton, John, et al., "The Physical Chemistry of Disinfection, I", The Journal of Infectious Diseases, Feb. 1916, vol. 18, No. 2, pp. 180-194.
Co-pending U.S. Appl. No. 18/162,779, filed Feb. 1, 2023, Carver et al. Now U.S. Publication No. 2023-0257632.

* cited by examiner

TACK SOLUTIONS AND THEIR USE IN APPLYING FILMS TO SUBSTRATES

CROSS-REFERENCE TO RELATED APPLICATION(S)

This application is a national stage filing under 35 USC § 371 of International Application Number PCT/US2019/057313, filed on, Oct. 22, 2019 which claims the benefit of the filing date to U.S. Provisional Application No. 62/756,755, filed on Nov. 7, 2018, the entire disclosures of which are incorporated by reference herein.

FIELD OF THE INVENTION

The present invention relates to tack solutions and their use in applying films to substrates such as vehicle bodies.

BACKGROUND OF THE INVENTION

Films such as window films applied to automobile windows are typically applied using a slip solution. In such a process, the release liner is first removed from the film to expose a compatible adhesive layer and the slip solution is applied to prevent the film from sticking to itself and to facilitate physical movement of the film across the surface of the window with reduced friction while the film is in contact with, but not permanently installed on, the window. Final and full adhesion typically occurs only when the slip solution has been squeegeed away from the space between the adhesive and the window, and any remaining slip solution residue has evaporated.

Paint protection films (PPFs) may also be applied to vehicle bodies using a slip solution, but proper adhesion of PPFs typically requires the use of a tack solution. Paint protection film is designed to exhibit high tack but cannot be allowed to touch itself during installation while dry, because peeling apart pieces of film would disrupt the uniform appearance of the adhesive and the film would become unusable because of the unsightly appearance of the film. Consequently, a slip solution is applied to the surface of the adhesive, typically by spraying, that provides a slip layer to the adhesive preventing it from sticking to any surface until the installer is ready to apply the film to its intended location. This also facilitates movement across the surface of the vehicle body during rough placement of the film on the vehicle body, if needed.

In contrast with conventional window film, paint protection film typically exhibits a certain level of elasticity or stretchability. This facilitates it being molded around 3-dimensional surfaces. To keep the film in place, the compatible mounting adhesive typically exhibits high tack, for example greater than 200 g, as measured using a ChemInstruments Probe Tack instrument. When the installer is ready to mount a piece of PPF coated with slip solution, they typically apply a tack solution to a specific and localized area of the vehicle body, typically by spraying, and position the PPF section coated with the slip solution precisely where it is intended to go. The tack solution is intended to promote adhesion between the film and the painted surface, and appears to act by one or more of: diluting the slip solution, thereby making it less effective (less slippery); chemically drying the area by "dissolving" the water and surfactant using alcohol (typically isopropyl alcohol); and reducing the surface tension of water, thereby promoting the ease of its removal via squeegeeing and very slightly beginning to dissolve the top most layer of adhesive. Vinegar may be used and is believed to act by both diluting the slip solution as well as chemically promoting adhesion. Alcohols, in contrast, are believed to act primarily by "dissolving" the water and surfactant. It is important to emphasize, however, that increased tack is the objective, regardless of the mechanism of action.

With respect to paint protection film, when the installer is ready to apply the paint protection film, they typically coat the whole area of film to be applied with slip solution and then apply tack solution in a localized area where the installation will begin, usually on one side. The tack solution is intended to promote tack in that localized area. Only a minimal pressure of squeegeeing is performed to enable the installer to move the film piece if that becomes necessary, but the tack should be high enough to prevent the film piece from moving while the installer pulls/stretches the film across the car body in preparation for tacking down the other side of the piece to the other side of the car, in the same fashion. Again, tack solution is applied to promote tack in a localized area, and minimal squeegeeing is performed to again enable the installer to stretch the film further, this time also tacking it down in the middle of the car body to provide three areas of attachment for the installation. Once all three areas are tacked down, the installer proceeds to squeegee out all the remaining fluid to conform the film to the 3-dimensional body of the car.

While vinegar may be used to increase tack, containing as it does significant quantities of acetic acid, it has an odor considered by many to be objectionable. Common alcohols for household uses such as ethyl alcohol and isopropyl alcohol may also be used, but also have an objectionable odor, and by some definitions are considered volatile organic compounds, or VOCS, subject to increasing regulatory scrutiny, especially for industrial uses.

There remains a need in the art for improved solutions for use in PPF installations to mitigate the level of VOCs being used by PPF installers, and to avoid unpleasant odors.

SUMMARY OF THE INVENTION

In a first aspect, the present invention relates to solutions containing formic acid that are useful in applying adhesive-coated films to substrates such as vehicle bodies. These solutions may be tack solutions used in combination with a separate slip solution, as described in the background of the invention and elsewhere herein, or alternatively may be solutions having both "slip" and "tack" properties in the same solution, that help prevent the film from sticking to itself, while facilitating tack when applied to a substrate such as a vehicle body.

In a further aspect, the present invention is directed to methods of applying adhesive-coated films to substrates that comprise applying an aqueous solution comprising formic acid to one or more of the film and the substrate, and thereafter applying the film to the substrate.

Further aspects of the invention are as set out below and in the claims that follow. It should be understood that the description and specific examples are intended for purposes of illustration only and are not intended to limit the spirit and scope of the present invention.

DETAILED DESCRIPTION

As utilized herein, the following terms or phrases are defined as follows:

A "compatible adhesive," as further described herein, means any adhesive that retains substantial adhesive properties after being exposed to: a slip solution; a tack solution;

both a slip solution and a tack solution; or a combination slip/tack solution. Full and final adhesion of a compatible adhesive to the surface to which it is applied typically occurs when any solution applied to the adhesive has been removed and/or has evaporated.

A "slip solution," as further described herein, means any solution that, when applied to a film having deposited thereon an adhesive layer, helps prevent the adhesive of the film from sticking to itself, and/or facilitates the film "slipping" or sliding across the surface of a substrate to which it is applied, or is to be applied, prior to final adhesion. This is typically achieved by use of one or more surfactants, and especially those that are compatible with the adhesive of the film.

A "tack solution," as further described herein, means any solution that increases the tack of an adhesive when applied to the adhesive, and especially to an adhesive that has a slip solution applied to it.

A combination "slip/tack solution," as further described herein, means a solution that has properties of both a slip solution and a tack solution in the same solution.

A "stretchable film" or "flexible film," as further described herein, means any film that stretches to any appreciable extent, and especially one adapted for application to the surface of a substrate, and especially a substrate having an uneven contour, such as a vehicle body, and especially a substrate that is not substantially planar.

A "paint protection film," as further described herein, means a film that is designed to be applied to a painted substrate, such as a vehicle body, and serves to protect the painted surface. These are typically, but need not be, flexible or stretchable films.

The "VOC content," as further described herein, refers to the volatile organic compound content of the solutions of the invention. For purposes of this description, lower alcohols such as those having from 1-5 carbon atoms are considered volatile organic compounds, as are lower acids having from 1-5 carbon atoms, including formic acid and acetic acid.

In one aspect, the invention relates to solutions useful in applying an adhesive-coated film to a substrate, the solutions being characterized as aqueous solutions containing formic acid.

In another aspect, the invention relates to methods of applying an adhesive-coated film to a substrate, comprising: contacting the adhesive-coated film with a slip solution comprising one or more surfactants; contacting the substrate with a tack solution comprising formic acid; and contacting the film with the substrate to thereby adhere the film to the substrate. The formic acid may be present in the tack solution, for example, in an amount from about 0.1% to about 10% by volume, or from 0.5% to 5% by volume.

In another aspect, the tack solution may further comprise an alcohol having from 1-5 carbon atoms, for example isopropyl alcohol present in the tack solution in an amount from about 1% to about 10% by volume. In a further aspect, the tack solution comprises a total of no more than 10% by volume of alcohols having from 1-5 carbon atoms and organic acids having from 1-5 carbon atoms.

In a further aspect, the one or more surfactants of the invention comprise sodium trideceth sulfate.

In yet another aspect, the adhesive-coated film may comprise a polyurethane film, or a stretchable film. In a further aspect, the substrate may be a painted substrate and the adhesive-coated film may comprise a paint protection film.

In a further aspect, the adhesive of the adhesive-coated film comprises a pressure sensitive adhesive that is tacky at ambient temperature, for example an acrylic-based polymer that is tacky at ambient temperature.

In a further aspect, the methods of the invention further include a step of removing a portion of the slip solution and a portion of the tack solution from between the film and the substrate by applying pressure to the film.

In yet another aspect, the methods of the invention are carried out by the contacting of the substrate with the tack solution occurring at a first localized area of the substrate, and the contacting the film with the substrate occurring at the first localized area of the substrate. In another aspect, the methods may further comprise subsequently stretching the film, applying the tack solution to a second localized area of the substrate, and contacting the film with the second localized area of the substrate to thereby adhere the film to both the first and the second localized areas of the substrate. In this aspect, as in others, the methods may further comprise removing a portion of the slip solution and a portion of the tack solution from between the film and the substrate by applying pressure to the film.

In yet another aspect, the invention relates to methods of applying an adhesive-coated film to a substrate, comprising: applying an aqueous solution of formic acid to one or more of the film and the substrate; and contacting the film to the substrate to thereby adhere the film to the substrate.

A wide range of amounts of formic acid may be used in the solutions of the invention, for example from about 0.05% to about 25%, or from 0.1% to 10%, or from 0.2% to 5%, in each case by volume. In further aspects, the amount of formic acid in the solutions of the invention may be at least 0.05%, or at least 0.1%, or at least 0.2%, or at least 0.5%, up to about 25%, or up to 20%, or up to 15%, or up to 12%, or up to 10%, in each case by volume. The solutions of the invention are typically comprised substantially or predominantly of water, that is, they are aqueous solutions that have additional amounts of other materials.

We have found that the solutions of the invention advantageously may also comprise minor amounts of a lower alcohol such as methanol, ethanol, propanol, isopropanol (isopropyl alcohol or IPA), butanol, or pentanol. Lower alcohols useful according to the invention thus may include those having at least one hydroxyl group and from 1-8 carbon atoms, preferably having a single hydroxyl group and from 1-5 carbon atoms. A wide range of amounts of one or more lower alcohols may be used, for example from about 0.05% to about 15%, or from 0.1% to 10%, or from 0.1% to 5%, or from 0.1% to 3%, in each case by volume. In further aspects, the amount of one or more lower alcohols used in the solutions of the invention may be at least 0.05%, or at least 0.1%, or at least 0.2%, or at least 0.5%, up to about 25%, or up to 20%, or up to 15%, or up to 12%, or up to 10%, or up to 5%, or up to 3%, in each case by volume. As noted, the solutions of the invention are typically comprised substantially or predominantly of water, that is, they are aqueous solutions that have additional amounts of other materials.

Although the solutions of the invention optionally and advantageously comprise minor amounts of one or more lower alcohols, as just described, those skilled in the art will understand the advantages according to the invention of the use of formic acid in minimizing or eliminating the use of IPA or other lower alcohols used in the solutions of the invention, as well as reducing or eliminating the use of acetic acid and other lower organic acids, to both reduce objectionable odor and to reduce VOC content. We have found, according to the invention, that a low concentration of formic acid, either alone or in combination with a lower alcohol such as IPA, can produce a tack solution providing a compatible adhesive with satisfactory initial tack properties, thereby obtaining satisfactory speed of installation, reducing the quantity of organic solvent needed, thereby reducing the total VOC content and consequent emissions, as well as reducing the odor during exposure by avoiding the use of vinegar or similar concentrations of acetic acid in water. Tack was found to occur generally faster when the fluid was applied, held the film in place more strongly than with a standard solution containing only IPA, requiring less force when squeegeeing the PPF during installation and did not promote lift lines if the film needed to be lifted away from the surface of the vehicle for repositioning and reapplication. Other benefits of the invention are described elsewhere herein.

The solutions of the invention may optionally comprise lower organic acids such as acetic acid, propionic acid, butyric acid, or the like, having from 2-5 carbon atoms. However, these acids have noticeable odor and contribute to the VOC content and thus are best reduced or avoided. Thus, in some aspects, the solutions of the invention contain no more than 5%, or no more than 2%, or no more than 1%, or no more than 0.5%, or no more than 0.1%, by volume, of organic acids having from 2-5 carbon atoms.

According to the invention, adhesive-coated films are applied to substrates, characterized as typically being tacky at ambient conditions. The adhesive used to coat the film is described herein as a "compatible adhesive," meaning that it retains substantial adhesive properties after being exposed to one or more of: a slip solution; a tack solution; both a slip solution and a tack solution; or a combination slip/tack solution. Full and final adhesion of a compatible adhesive to the surface to which it is applied typically occurs when any solution applied to the adhesive has been removed and/or has evaporated. This functional description is not intended to be especially limiting, and is intended to encompass any adhesive that may be advantageously used with one or more of the tack solutions, slip solutions, or slip/tack solutions of the invention.

A wide variety of compatible adhesives are useful according to the invention, for example acrylic-based polymers that may be cross-linked. Other examples include non-crosslinked PSAs where the base polymer is an A-B-A type block copolymer rubber, an A-B-A type random copolymer or a hydrogenation product (hydrogen addition product) thereof; and PSAs in which the base polymer is a butene polymer containing butene (inclusive of 1-butene, cis- or trans-2-butene and 2-methylpropene (isobutylene)) as the main monomer. Further examples of a non-crosslinked PSA are olefin polymers, such as propylene-a-olefin copolymers and propylene-ethylene-a-olefin copolymers. Again, any compatible adhesive that retains substantial adhesive properties after being exposed to the solutions of the invention containing formic acid may be used according to the invention.

Slip solutions that are useful according to the invention are characterized by the presence of one or more surfactants in an aqueous solution. Suitable slip solutions thus include those that are analogous to traditional baby shampoo in water. For example, a suitable formulation used as a slip solution concentrate includes from about 85-95% water, from about 1 to about 10% ethoxylated sorbitan monolaurate, and from about 1 to about 5% sodium trideceth sulfate. The amount of surfactant(s) present in the slip solutions may thus vary widely, for example from about 0.01% to about 10% by volume, or from 0.05% to 5%, or from 0.1% to 2.5% by weight. In further aspects, the amount of one or more surfactants used in the solutions of the invention may be at least 0.01%, or at least 0.05%, or at least 0.1%, or at least 0.5%, up to about 15%, or up to 10%, or up to 5%, or up to 2.5%, or up to 2%, or up to 1%, or up to 0.5%, in each case by weight.

These slip solutions may include further additives, if advantageous, so long as the solutions remain compatible with the adhesive. Other suitable slip solutions are other formulations that contain sodium trideceth sulfate as a surfactant. When sodium trideceth sulfate is formulated in baby shampoos, it acts as a low-irritation cleansing agent, and when formulated in a slip solution for use according to the invention, is compatible with the adhesive of the film such that the adhesive retains substantial adhesive properties after being exposed to the slip solution. Surfactants other than sodium trideceth sulfate may alternatively be used in the slip solutions of the invention, especially non-ionic surfactants which are much milder than charged anionics. Thus, for example, nonionic surfactants of the form of polyethoxylated synthetic glycolipids and/or polyethoxylated synthetic monoglycerides may be advantageously used according to the invention. However, charged anionic surfactants may nonetheless be used so long as they are compatible with the adhesive used, such that the adhesive retains substantial adhesive properties after being exposed to the slip solution containing such anionic surfactants. Also, contrary to baby shampoos in which surfactants producing anesthetizing effects are best avoided, alkyl polyethoxylates or alkylphenol polyethoxylates may be used as surfactants in the slip solutions of the invention, again so long as they are compatible with the adhesive used, such that the adhesive retains substantial adhesive properties after being exposed to the solutions containing such surfactants.

When the solutions of the invention are solely tack solutions, they advantageously comprise aqueous solutions of formic acid, optionally with minor amounts of lower alcohols such as IPA, and optionally other ingredients. However, when the solutions according to the invention are combination slip/tack solutions in which a single solution has both slip and tack properties, the solutions of the invention further comprise ingredients of the slip solution as just described, and especially one or more surfactants. A variety of aqueous solutions are useful according to the invention, as described herein, as slip/tack solutions, so long as they contain formic acid and a surfactant and are compatible with the adhesive used, such that the adhesive retains substantial adhesive properties after being exposed to the slip/tack solutions containing formic acid and one or more surfactants. It should be noted that slip/tack solutions may not be preferable in the installation of films on substrates, as they are an inherent compromise in which both slip and tack properties are provided in the same solution. In general, more satisfactory results are typically achieved when a slip solution is first applied to the adhesive layer of a film, after which a separate tack solution is applied, preferably locally to a spot on the surface of the substrate to which the film is intended to be adhered.

A wide variety of films may be used according to the invention for application to a suitable substrate, including polyesters such as polyethylene terephthalate polymers and copolymers, polyethylene naphthalate, and the like, that are traditionally used in window films. Alternatively, polyolefins such as polypropylene, polyethylene, or blends of the two may be used. Preferably, polyurethanes, and especially thermoplastic polyurethanes having good heat and UV resistance, may be advantageously useful according to the invention when the film to be applied is a stretchable film and especially a paint protection film. These films are characterized by a thickness, for example, from about 50 microns to about 500 microns, or from 100 microns to 350 microns. These films may be comprised of a single polyurethane layer, or more than one polyurethane layer. These polyurethanes are typically reaction products of one or more polyols and one or more diisocyanates and/or triisocyanates.

In one aspect, the invention relates to a method of applying a film to a substrate such as a vehicle body, that comprises a step of applying a solution comprising formic acid to one or more of the film and the substrate, and thereafter adhering the film to the substrate. In one aspect, the solution comprising formic acid is applied to the substrate. In another aspect, the solution comprising formic acid further comprises a lower alcohol having from 1-5 carbon atoms, for example isopropyl alcohol.

In one aspect, the solution comprising formic acid is a tack solution, and is applied to the substrate prior to the film being contacted or adhered to the substrate. In another aspect, the solution comprising formic acid is a tack solution, and the film is contacted with a slip solution comprising a surfactant prior to the film being contacted or adhered to the substrate. In a further aspect, the solution comprising formic acid is a slip/tack solution further comprising one or more surfactants.

In other aspects, the invention relates to methods of applying a film to a substrate, that include one or more of the steps of (i) removing a release liner for the film to expose a compatible adhesive layer; (ii) applying a solution such as a "slip solution" to facilitate physical movement of the film with reduced friction while the film is in contact with (but not permanently installed on) the vehicle body; (iii) applying a solution, such as a tack solution or a slip/tack solution comprising formic acid, to at least some selective area(s) of the vehicle body to facilitate higher friction and/or tack of the film to the vehicle body at those selective areas; and (iv) physical manipulation of the film (e.g. stretching, squeegeeing and the like) as part of the final installation. The tack solution or slip/tack solution is an aqueous solution that includes formic acid. In an embodiment, the aqueous solution is devoid of IPA and includes 2% formic acid. In an embodiment, the aqueous solution includes both IPA and formic acid. In an embodiment, the aqueous solution has a total volatile organics content (VOC in %) of less than 20, or less than 15, or less than 10 or less than 8, in each case based on the total amount of lower alcohols and lower organic acids present in the aqueous solution comprising formic acid.

The films useful according to the invention are thus adhesive-coated films in which the films are coated with a compatible adhesive. The compatible adhesive, in turn, may be protected from premature adhesion by a release liner, which can be any suitable material that prevents the adhesive from sticking to itself, to the film substrate, or to another object, prior to being adhered to the substrate to which it is to be adhered.

Once the release liner is removed, a slip solution is applied to at least the portion of the film that is coated with the adhesive. The slip solution may be a solution that functions only as a slip solution, or may be a slip/tack solution having both slip and tack functionality, that is, having both formic acid and at least one surfactant. When the slip solution is a slip/tack solution, there is, of course, no requirement that a separate tack solution be applied, although applying a separate tack solution to a film having a slip/tack solution already applied is still within the scope of the invention.

If the slip solution lacks appreciable tack functionality, tack solution comprising formic acid is then advantageously applied to at least some selective area of the vehicle body to facilitate higher friction and/or tack of the film to the vehicle body at those selective areas. Once this tack is achieved, the film may then be physically manipulated by, for example, stretching, squeegeeing, and the like to adhere the film to other parts of the substrate as part of the final installation. By squeegeeing we mean applying pressure to the film, typically while in contact with the substrate, to press the film to the substrate while simultaneously removing liquid from the space between the film and the substrate. This facilitates adhesion of the film to the substrate and removal of solution such as slip and/or tack solution from between the film and the substrate.

A person skilled in the art will recognize that the measurements described herein are standard measurements that can be obtained by a variety of different test methods. The test methods described represents only one available method to obtain each of the required measurements.

The foregoing description of various embodiments of the invention has been presented for purposes of illustration and description. It is not intended to be exhaustive or to limit the invention to the precise embodiments disclosed. Numerous modifications or variations are possible, in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

EXAMPLES

Methods

A 2018 Chevy Traverse was used as a test vehicle. This vehicle represents a demanding test subject because the front of the hood is particularly bulbous. The installation involved one side of the PPF piece being tacked down first with tack solution and then stretched significantly across the surface and tacked on the other side before installing the front, i.e. pulling into place for squeegeeing. The surface of the hood was prepared by cleaning off dust, dirt and oils with soapy water and rinsing with more water before installation, and a new piece of PPF was used for each fluid under examination. The experienced installer/trainer's comments were recorded during and after each installation. Aside from obvious signs such as odor, the installer was not aware of which solution was being tested in a given instance.

All of the inventive tack Solutions 1-4 exhibited a high degree of tack promotion (especially #4) while lowering the quantity of alcohol required, lowering the overall level of VOCs present, and reducing the odor level to one that is barely noticeable. We note that formic acid has an odor threshold limit that is at least twice that of acetic acid, i.e. the human olfactory cells are less sensitive to formic acid than acetic acid.

TABLE 1

| Solution | Formula (%) H₂O | IPA | FA | VOC (%) | Comments |
|---|---|---|---|---|---|
| Control | 80 | 20 | — | 20 | — |
| 1 | 89 | 10 | 1 | 11 | Tacked quickly, performed similarly to a 10% IPA solution, but still needed to be squeegeed. Fingers laid down quickly. No lift lines. |
| 2 | 98 | — | 2 | 2 | Slight odor. Slow tack, but good enough. Not as good as Solution 4. Fingers go down slower, but stay down once laid. |
| 3 | 93 | 5 | 2 | 7 | Tacks fairly well. Stronger alcohol smell, but not too bad. Did not tack as quickly or as well as Solution 4. Requires more squeegeeing. No acid smell. Fingers go down well. |
| 4* | 94 | 3 | 3 | 6 | Very good tack. Fast. Very tolerable slight odor. No lift lines, Fingers go down instantly. Better than control solution used. |

Fingers are where the film folds up and forms a tunnel over the surface of the vehicle.

After installing identical PPF pieces on the front of a 2018 Chevy Traverse and using each tack fluid to promote adhesion during installation, the appraisal showed that all the tack solutions work in respect of promoting tack of PPF to the surface of the car. Table 1 shows that some tack fluids delivered better performance and usability than others. We note that formic acid is classified as a VOC, according to our description, but the use of formic acid clearly adds performance to a tack solution while enabling the reduction of the total quantity of VOCs being used.

The invention claimed is:

1. A method of applying an adhesive-coated film to a substrate, comprising:
    contacting the adhesive-coated film with a slip solution comprising one or more surfactants;
    contacting the substrate with a tack solution comprising formic acid; and
    contacting the film with the substrate to thereby adhere the film to the substrate.

2. The method of claim 1, wherein formic acid is present in the tack solution in an amount from about 0.1% to about 10% by volume.

3. The method of claim 1, wherein formic acid is present in the tack solution in an amount from about 0.5% to about 5% by volume.

4. The method of claim 1, wherein the tack solution further comprises an alcohol having from 1-5 carbon atoms.

5. The method of claim 4, wherein the alcohol having from 1-5 carbon atoms is isopropyl alcohol present in the tack solution in an amount from about 1% to about 10% by volume.

6. The method of claim 1, wherein the tack solution comprises a total of no more than 10% by volume of alcohols having from 1-5 carbon atoms and organic acids having from 1-5 carbon atoms.

7. The method of claim 1, wherein the one or more surfactants comprise sodium trideceth sulfate.

8. The method of claim 1, wherein the adhesive-coated film comprises a polyurethane film.

9. The method of claim 1, wherein the adhesive-coated film comprises a stretchable film.

10. The method of claim 1, wherein the substrate is a painted substrate and the adhesive-coated film comprises a paint protection film.

11. The method of claim 1, wherein the adhesive of the adhesive-coated film comprises a pressure sensitive adhesive that is tacky at ambient temperature.

12. The method of claim 1, wherein the adhesive of the adhesive-coated film comprises an acrylic-based polymer that is tacky at ambient temperature.

13. The method of claim 1, further comprising removing a portion of the slip solution and a portion of the tack solution from between the film and the substrate by applying pressure to the film.

14. The method of claim 1, wherein the contacting of the substrate with the tack solution occurs at a first localized area of the substrate, and the contacting the film with the substrate occurs at the first localized area of the substrate, and wherein the method further comprises subsequently stretching the film, applying the tack solution to a second localized area of the substrate, and contacting the film with the second localized area of the substrate to thereby adhere the film to both the first and the second localized areas of the substrate.

15. The method of claim 14, further comprising removing a portion of the slip solution and a portion of the tack solution from between the film and the substrate by applying pressure to the film.

* * * * *